July 19, 1927. Re. 16,686

H. C. MOULTON

GARMENT AND LIKE ARTICLE OF MANUFACTURE

Original Filed June 9, 1922

Inventor

HARLEY C. MOULTON,

By S. George Tate

Attorney

Reissued July 19, 1927. Re. 16,686

UNITED STATES PATENT OFFICE.

HARLEY C. MOULTON, OF MAPLEWOOD, MISSOURI, ASSIGNOR, BY MESNE ASSIGNMENTS, TO LEWIS INVISIBLE STITCH MACHINE CO., A CORPORATION OF MAINE.

GARMENT AND LIKE ARTICLE OF MANUFACTURE.

Original No. 1,574,405, dated February 23, 1926, Serial No. 567,043, filed June 9, 1922. Application for reissue filed May 24, 1926. Serial No. 111,462.

This invention relates to improvements in machine-made articles comprising a body presenting two or more layers of sheet material formed by folding the material so as to place portions of the same face of two of said layers in juxtaposition and uniting the same by a series of blind stitches located at a distance from the line of fold.

More specifically an object of the invention is to provide a plain edge garment comprising a plurality of layers connected by an infolded edge seam with a blind stitch elastic seam connecting said layers at a distance from the infolded edge.

In the manufacture of garments, such as, coats the body of the coat is provided with a facing which extends back from the edge of the coat and is either connected to the body of the coat or to a lining at some distance from the edge of the coat. In the completed coat the lower portion of this facing lies upon the inside of the coat and extends a sufficient distance back to prevent the lining from being displayed when the coat is worn. In the lapel of the coat, which is turned back, the facing is displayed upon the outside of the garment. In usual constructions the facing is of the same material as the outside fabric of the coat and is connected to the outside fabric by an infolded edge seam. In some coats, such as certain types of "Tuxedo coats," "full dress" coats and overcoats, the facing is made of a different material from that which forms the outside or body of the coat so that the facing presents a different appearance from the body of the coat. In usual garment constructions a line of through and through stitching extends immediately adjacent the edge of the coat and serves more firmly to connect the outside and facing of the coat together at the edge and thereby to prevent rolling of the edge seam. In plain edge coats this line of stitching is omitted, but in order to prevent the undesirable rolling of the edge seam of the coat it has been necessary to stitch the facing to the outside of the coat, or preferably to the stiffening member of the coat, by a line of stitching located more or less in proximity to the infolded edge seam. This line of stitching has heretofore been made by hand and greatly increases the cost of production of plain edge coats. Furthermore, this line of hand stitching has heretofore comprised a single thread alternately tacked to the facing and the outside fabric or to the stiffening member of the coat.

The present invention contemplates the production of a coat in which the facing is secured to the outside fabric or the stiffening member by a machine-made elastic, lock stitch or chain stitch seam of blind stitching, the elasticity of the seam being such that it will permit the coat to be pressed properly without wrinkling or checking, and yet hold the facing permanently in place and prevent rolling of the infolded edge seam.

The invention more broadly includes the stitching together of the substantially continuous face of the layers of a folded fabric at a distance from the edge of the fold so that by spreading the loop of the fold and pressing it down a box plait may be produced.

Various other machine-made articles or products are included in the scope of the present invention as will be readily understood by those skilled in the art.

The invention is disclosed herein as embodied in a usual form of coat both in respect to the means for securing the juxtaposed faces of the body and facing of the coat together and also as embodied in the box plait of a coat of the "Norfolk" type.

Figure 1:
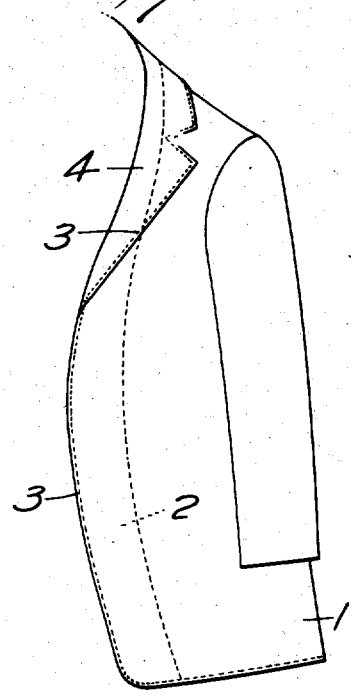
Fig. 1 is an elevation of one side of the front and arm of a coat showing the usual seam of through and through stitching extending along the edge of the coat.

In usual garment constructions as embodied, for example, in the coat illustrated in Fig. 1, the outside 1 of the coat is provided with an inner facing 2 which is connected to the edge of the coat by an infolded seam. A line of through and through stitching 3 extends along and closely adjacent to the edge of the coat through the infolded edge to prevent the infolded edge seam from rolling. The lapel 4 of the coat is formed by folding back the upper edge portion of the garment so that the facing 2 is displayed. The line of stitching 3, however, is displayed along the edge of the lapel as well as the edge of the body of the coat.

Figure 2:
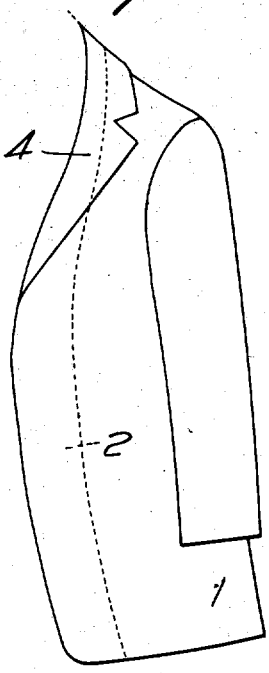
Fig. 2 is a similar view of a plain edge coat.

In certain coats and other garments now in vogue it has been found desirable to omit the line of through and through stitching which extends along the edge of the coat so that a garment is produced in which no seam is displayed either upon the edge of the body of the coat or the lapel. Such a garment is illustrated in Fig. 2. In the formation of the plain edge garment, however, as before stated, it is necessary to stitch the facing to the outside or body of the coat or to the stiffening layer of a stiffened coat front so as to prevent the infolded edge from rolling. This has heretofore been accomplished by manually tacking the facing to the outside, or to the stiffening member of a stiffened garment, by a single thread which is alternately caught in the adjacent portions of the facing and the outside or the stiffening member.

The present invention comprises a plain edge coat in which the facing is stitched to the outside or to the stiffening member by a machine-made, elastic, preferably lock-stitch seam. Such a construction has, so far as I am aware, never heretofore been accomplished.

The present invention more broadly contemplates a product or article of manufacture of sheet material in which the portions of a body, which may comprise a single sheet or a plurality of superimposed sheets, is folded to produce a loop and portions of one substantially continuous face of the body juxtaposed and secured together by an elastic, preferably lock-stitch seam of blind stitching in which loops of one thread alternately enter and emerge from the juxtaposed face portions of said layers and are concatenated by a locking thread.

Steps in forming a plain edge and the box plait of a garment are shown in the accompanying drawing as illustrative of some of the embodiments of the present invention. It will, however, be understood that other adaptations of the invention may be made within the scope of the claims.

Figure 4:
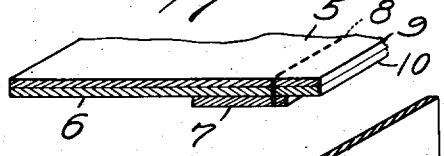
Fig. 4 is a perspective view of an edge section of the facing and outside fabric of the coat secured together and to a tape by a line of through and through stitching which forms an initial step in the assembly of the coat.

One of the first steps in the final assembling of a coat or other garment having an infolded edge is illustrated in Fig. 4 in which the facing 5 is superimposed upon the outside fabric 6 which forms the body of the garment and are secured together and to a tape 7 extending along the edge by a line of through and through stitching 8

Figure 5:
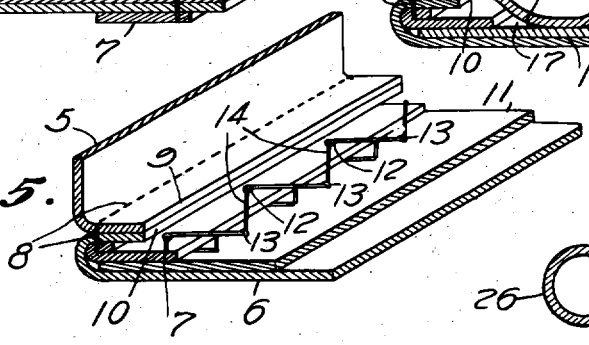
Fig. 5 is a perspective view showing a succeeding step in the manufacture of a coat in which the united and taped edges of the facing and outside of the coat are shown partially in infolded position and a stiffening member attached to the tape by an elastic seam.

The next step in the formation of the garment consists in folding the facing around the juxtaposed edges 9 and 10 as illustrated in Fig. 5. It will be noted that when this is done the tape 7 is folded back upon itself and extends at a distance beyond the edges 9 and 10 of the infolded seam. Where the garment is provided with a stiffening layer, such as a layer of canvas, this stiffening layer 11 desirably is secured to the projecting edge of the tape 7 by an elastic seam such as a felling or an overedge seam.

In the construction illustrated in Fig. 5 a lock stitch seam is shown which comprises a series of alternating loops of needle thread 12 and 13 which respectively pass through the tape and enter and emerge from the upper or inner surface of the stiffening layer 11 and are connected together by a concatenating thread 14 which passes through the successive loops.

Thus it will be obvious that the tape is secured to the stiffening layer 11 by a blind stitch seam which does not pass through to the displayed face of the outer layer 6. Where a garment is formed without a stiffening layer the tape may be similarly sewed to the outside layer by a line of blind stitching which does not pass through the displayed face of said outside layer.

Inasmuch as the garment may be constructed either with or without a stiffening layer, and also since the folded portion of the garment may comprise a single or a plurality of layers of material, the single or superimposed layers are defined herein as the "body" of the material. The "body", whether made of a single layer of material or a plurality of superimposed layers, presents, when in a flat condition, substantially continuous lower and upper faces, when the seams connecting the layers are disregarded. Thus in the construction illustrated in Fig. 6 the face portion 15 of the outside 6 of the garment and the face portion 16 of the facing constitute, when the facing is extended before folding, a substantially continuous outer face. Likewise the inner face portion 17 of the stiffening layer, when a stiffening layer is employed, or the inner face portion 18 of the outside 6, when a stiffening layer is not employed, is substantially continuous with the face portion 19 of the facing and constitute the upper face of the body as above defined, irregularity due to the formation of the infolded seam being disregarded.

Figure 6:
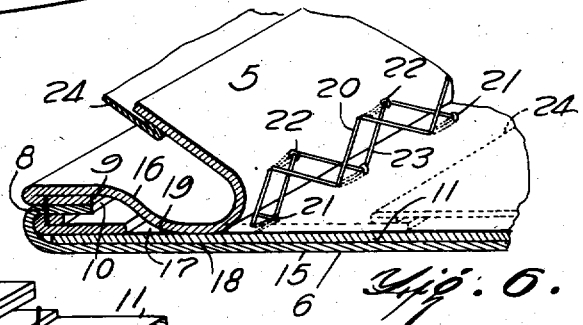
Fig. 6 is a perspective view showing the manner in which a plain edge coat is constructed in accordance with the present invention in which the facing is stitched to the stiffening layer at a distance from the edge of the infolded seam.

When, therefore, the material is folded as illustrated in Fig. 6 the face portion 19 of the facing is placed in juxtaposition to the same face portion 17 of a layer forming a portion of the body of the garment, and in the present invention these face portions are secured together by an elastic lock stitch seam of blind stitches in which the loops alternately penetrate the adjacent surfaces of the facing and stiffening layer or outer layer as the case may be without passing through the opposite surface of either layer.

The particular form of blind stitch seam, which is illustrated in Fig. 6, comprises a main or needle thread 20 having a series of loops 21 which enter and emerge from the upper face of the stiffening member 11 and an alternating series of loops 22 which enter and emerge from the same continuous face of the facing layer, the loops 21 and 22 being in staggered position in the respective layers. The loops 21 and 22 are connected by a concatenating thread 23. A relatively loose tension is applied to the threads of the seam so that the seam is sufficiently elastic to permit the goods to be pressed into proper position without wrinkling, but serves to retain the juxtaposed face portion of the stiffening member and facing sufficiently to prevent rolling of the inturned edge which would occur in the absence of means for securing the facing to the stiffening layer or to the outside layer.

In Fig. 6 the free edge of the facing is shown in full lines as rolled upwardly in order to display the line of stitching and in dotted lines is shown in the position in which it lies in the assembled garment. The usual lining 24 is secured to the inner edge portion of the facing in the usual manner as illustrated in dotted lines.

Figure 7:
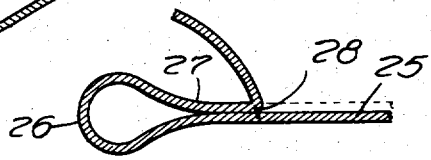
Fig. 7 is a vertical sectional view showing the invention as applied to a single sheet of material in the manner similar to that illustrated in Fig. 6, stiffening layer and infolded seam being omitted.
Figure 8:
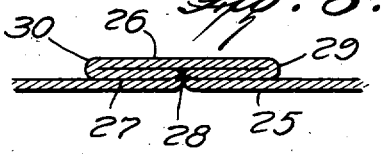
Fig. 8 is a transverse sectional view of the construction illustrated in Fig. 7 showing the loop spread and pressed down to form a box plait.

Fig. 7 illustrates the invention as applied to a single sheet of material folded to present two layers, the juxtaposed portions of the same face of the layer being secured together by a line of blind stitching comprising loops which enter and emerge from the same face of the juxtaposed portions of the material without passing through the opposite face of either layer. In this construction the sheet of material 25 is bent to form a loop 26, the upper layer 27 of material forming the loop being connected to the lower layer by a line of blind stitches 28 preferably similar to the line of stitches comprising the alternating loops 21 and 22 illustrated in Fig. 3 which respectively enter and emerge from the juxtaposed portions of the same face of the material.

Figure 3:
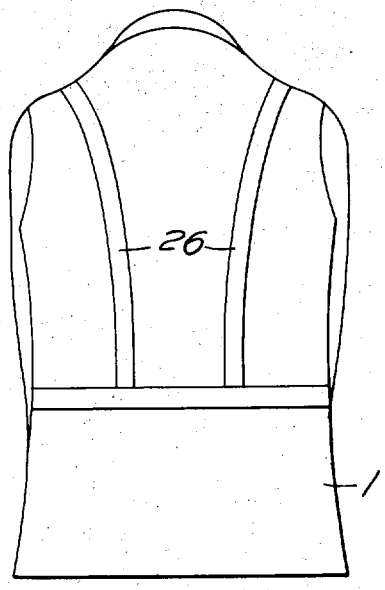
Fig. 3 is a back view of a "Norfolk" type of coat having box plaits extending from the shoulder to the waist.

The loop thus formed may, instead of providing a plain edge, be spread and pressed to form a box plait. The edges 29 and 30 extend equal distances from the line of the seam 28. In Fig. 3 a box plait of this character is shown as embodied in the back of a coat. The front of the coat preferably is provided with a plain edge as illustrated in Fig. 2.

The invention may be readily adapted to other forms of garments and to other articles of manufacture as will be apparent to those skilled in the art. Consequently, it will be understood that the particular embodiments of the invention disclosed herein are illustrative and not restrictive of the scope of the following claims.

Having thus described my invention, what I claim as new, and desire to secure by Letters Patent, is:

1. In a seam, the combination of two separate body fabrics arranged in superposed relation, the inner marginal portions being inturned and secured by a line of stitching, and a line of blind stitches connecting the fabrics and extending parallel with said inturned marginal portions but spaced therefrom, said blind stitches including a series of equally spaced and anchored penetrant needle thread loops which enter and emerge respectively from the inner faces of said body fabrics.

2. A machine-sewed article comprising a plurality of layers of sheet material connected by an infolded edge seam and having the juxtaposed face portions of two of said layers united by an elastic lock stitch seam of blind stitches which do not pass through the outer face of either layer and which are located at a distance from the infolded edge and remote from the edges of said layers.

3. A plain edge garment having a body comprising a plurality of layers including an outer layer and a facing connected thereto by an infolded edge seam and having the juxtaposed portions of the face of said facing and a portion of the same substantially continuous face of another layer connected by an elastic lock stitch seam of blind stitches which do not pass through the outer face of either layer and which are located at a distance from said infolded edge and remote from the edges of said layers.

4. A plain edge garment having a body comprising an outer layer and a facing connected together by a taped infolded edge seam, a layer of stiffening material connected to said tape by an elastic seam and presenting with said facing a substantially continuous face and having an elastic lock stitch seam of blind stitches connecting the juxtaposed portions of the face of said stiffening layer and the facing at a distance from said infolded edge and remote from the edges of said stiffening layer and facing.

5. A machine-sewed article comprising a body of sheet material folded to present two layers having portions of the same face of the body juxtaposed and united by an elastic blind stitch seam comprising a series of alternating loops of thread which respectively enter into and emerge from the juxtaposed face portions of the respective layers at a distance from the line of fold and remote from the edges of said layers and extend in a direction of the line of the seam and means concatenating said alternating loops extending in directions oblique to the line of the seam.

6. A machine-sewed article having a body comprising outer layers of sheet material connected by an infolded edge seam, a sheet of stiffening material connected to the infolded edge and an elastic blind stitch seam, connecting the juxtaposed face of one of said outer layers and said stiffening sheet at a distance from the infolded edge and remote from the edges of said outer layer and said stiffening sheet, comprising a thread having alternating loops which respectively enter into and emerge from the respective juxtaposed face portions of said stiffening material and one of said outer layers and which extend in the direction of the line of the seam and a thread concatenating said loops the sections of which between the loops extend in directions oblique to the direction of the line of the seam.

7. A plain edge garment having a body comprising an outer layer and a facing connected together by a taped infolded edge seam, a layer of stiffening material connected to said tape by an elastic lock-stitch seam comprising a series of alternating loops which respectively enter into and emerge from the respective juxtaposed faces of the stiffening material and the tape and are connected by a concatenating thread the portions of which between the loops overlie the edge of the tape and an elastic lock-stitch seam connecting said stiffening layer and facing together at a distance remote from the infolded edge seam and also remote from the edges of said stiffening layer comprising a series of alternating loops of thread which respectively enter into and emerge from the juxtaposed faces of said facing and stiffening layers respectively and extend in the direction of the line of seam and a concatenating thread connecting said alternate loops the sections of which intermediate of the loops extend in directions oblique to the line of the seam.

In testimony whereof I hereunto affix my signature.

HARLEY C. MOULTON.